Patented Mar. 23, 1948

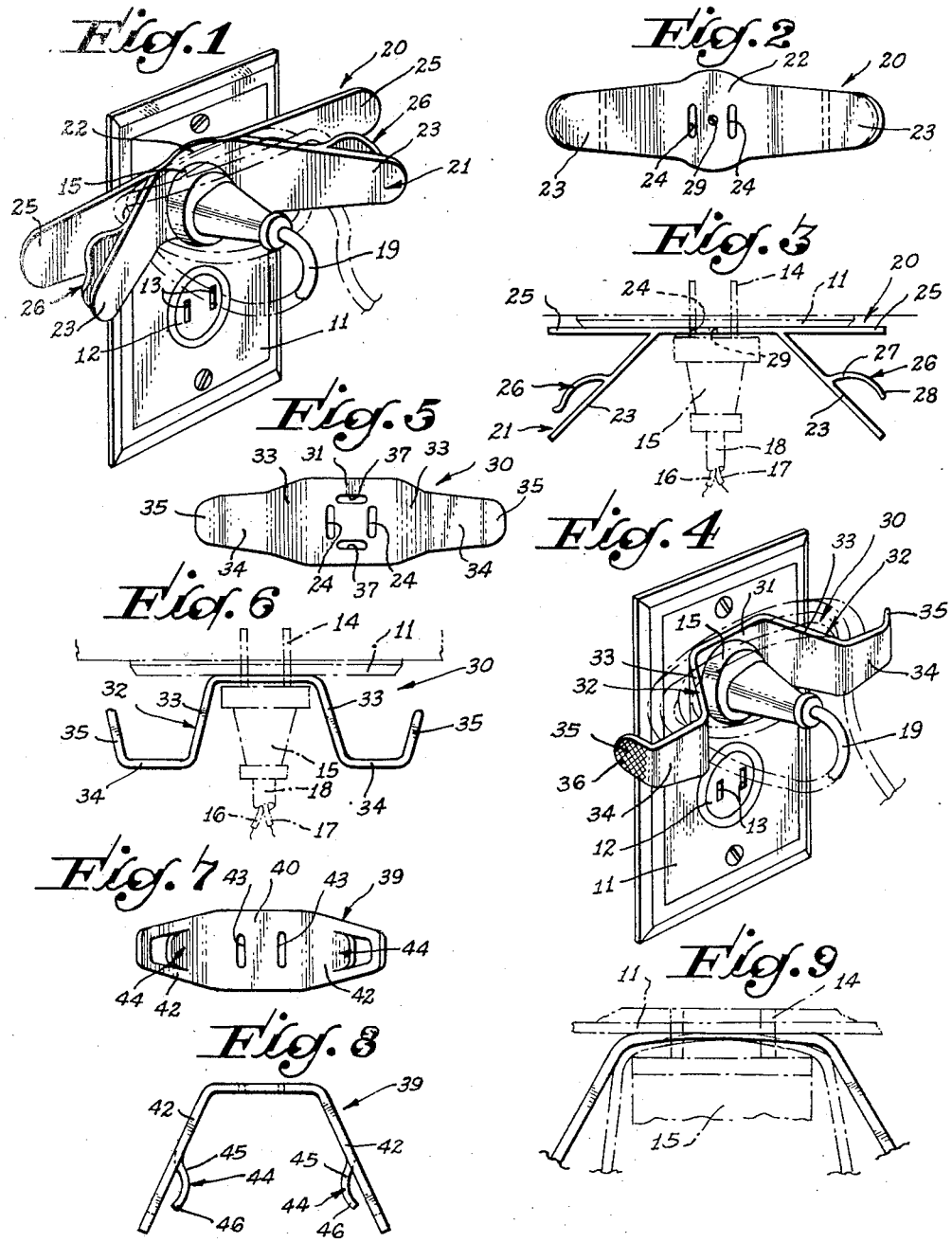

2,438,143

UNITED STATES PATENT OFFICE 2,438,143

CORD SUPPORT

Frank E. Brown, Burbank, Calif., assignor to Frederick M. Turnbull, Los Angeles, Calif.

Application September 10, 1945, Serial No. 615,286

2 Claims. (Cl. 173—361)

My invention relates to a cord support, and more particularly to a device upon which the excess length of an electric cord associated with a wall socket may be wound.

When an electrical appliance, such as a floor lamp or a table lamp or the like, is connected by an electric cord to a socket cap removably connected to a wall or floor socket, the excess length of the cord over that required to connect the lamp directly to the socket is usually permitted to lie upon the floor where it presents a hazard to those walking over it and is unsightly in appearance. Likewise, when electrical appliances, such as toasters, percolators, or the like, are connected through an electric cord and socket cap to a wall socket some distance above the floor, the excess length of such cord over that required to connect directly the appliances to the wall socket is inconvenient, annoying and unsightly.

It is an object of my invention to provide a simple device by which such excess length of electric cord may be readily supported adjacent the socket so that the electric cord extends directly from the wall or floor in which the socket is recessed to the lamp or electric appliance.

In the conventional form of removable cap for a wall or floor socket having prongs which are inserted in recesses in the socket for engagement with strip contacts within the socket, considerable physical force is frequently necessary to remove the cap from the socket, inducing the user, through necessity or inclination, to remove the cap by pulling upon the cord. This tends to damage the electric cord either at its points of connection to the cap or adjacent to the cap so that its insulation is broken and the electrical conductors within the cord are exposed. The effect of such exposure is to create a substantial hazard of shock to the user and short circuiting, causing fire to the structure.

It is an object of my invention to provide a cord support of the nature described which permits the user quickly and with little effort to remove the cap and cord from the socket without imposing any tension upon the cord and without touching the cord or the cap.

It is frequently desirable, as, for example, when the cap is removed from the socket, only temporarily to retain the excess length of the electric cord positioned adjacent the cap so that, when the cap is again inserted in the socket, the excess length of the electric cord is again supported adjacent the socket. It is another object of my invention to provide a cord support having means for so retaining the excess length of the electric cord adjacent the cap after the cap is removed from the socket.

Further objects of my invention include the provision of a device of the character described which is simple in construction, economical in manufacture, positive in operation, and attractive in appearance.

Embodiments of my invention capable of accomplishing the foregoing objects and others are illustrated in the accompanying drawing, in which Fig. 1 is a perspective utility view illustrating a device of my invention installed between a cap and wall socket;

Fig. 2 is a front elevational view of the cord support illustrated in Fig. 1;

Fig. 3 is a plan view showing the device of Fig. 1;

Fig. 4 is a perspective view illustrating another embodiment of my invention;

Fig. 5 is a front elevational view of the support illustrated in Fig. 4;

Fig. 6 is a plan view of the support illustrated in Figs. 4 and 5;

Fig. 7 is a front elevational view of another embodiment of my invention;

Fig. 8 is a plan view of the support illustrated in Fig. 7; and

Fig. 9 is a plan view illustrating the removal of the cap by the deformation of any of the supports illustrated in the other figures.

Referring to the drawing, which is for illustrative purposes only, the numeral 11 indicates a wall plate having therein two electrical sockets 12. The sockets 12 are of conventional construction having a pair of openings 13 into which conductor prongs 14 of a cap 15 may be inserted for electrical contact with conductor strips not shown. The prongs 14 are maintained in electrical contact with such conductor strips either by friction or the resilience of the prongs 14 or the conductor strips or both. The prongs 14 are connected in any suitable manner with two conductors 16 and 17 contained within an insulating sheath 18, the conductors and sheath constituting the electric cord 19 connecting the cap 15 to an electrical apparatus.

In the form of the invention illustrated in Fig. 1 the cord support is indicated generally by the numeral 20. The support 20 includes a primary member 21 comprising a central plane portion 22 and outwardly diverging arms 23. Formed in the central portion 22 is a pair of openings 24 adapted for the passage therethrough of the prongs 14, which are associated with the cap 15. The central portion 22 is made sufficiently thin so that no impediment is presented to the contact of the prongs 14 and their retention in contact with the conductor strips within the socket 12 when the support 20 is installed between the cap 15 and the socket 12, as illustrated in Fig. 1.

The numerals 25 indicate auxiliary arms formed on the plane portion 22 and extending in the same plane as the portion 22 and the diverging arms 23.

As illustrated in Figs. 1 and 2, the upper and lower edges of the plane portion 22 may be rounded so that it substantially covers the socket 12, and the diverging arms 23 may be tapered outwardly and rounded at their ends, with the auxiliary arms 25 of an outline substantially the same as the horizontal projection of the diverging arms 23 when the support 20 is in its position of use, as illustrated in Fig. 1.

Formed on the rearward side of each of the diverging arms 23 is an engaging member 26. Each of the engaging members 26 is joined at its rearward end to one of the diverging arms 23 and has an outwardly projecting portion 27 and a return portion 28 terminating a short distance from the rearward surface of its associated diverging arm 23.

When the cord support 20 has been installed between the cap 15 and the socket 12, the excess length of the electric cord 19 may be wound between the diverging arms 23 and the auxiliary arms 25 and then passed between one of the engaging members 26 and its associated diverging arm 23 so that it is prevented from unwinding from the support 20. If it is desired, the engaging members 26 may be spaced from their associated arms 23 different distances, as illustrated in Fig. 3, to provide for the securing of electric cords 19 of different diameters. The engaging members 26 are of such dimensions and outline as to resiliently clamp cords of different diameters.

The cord support 20 is preferably formed of a dielectric material, such as a suitable plastic, and may be formed in any desired manner, as, for example, by molding. The material may be colored and transparent, opaque, translucent or variegated if desired. The various portions of the cord support 20 are made of such dimensions that, when manual force is applied to the ends of the diverging arms 23 urging them together, the plane portion 22 of the support is bent in a manner to eject the prongs 14 from the socket 12, as is hereinafter described in greater detail.

The central plane portion 22 may be provided with a central opening 29 for the reception of a screw which may extend into the threaded opening centrally disposed in wall and floor sockets of conventional construction when it is desired to attach permanently the support 20 to the wall plate 11. The central opening 29 may be used for securing the support 20 to a cap 15 whose construction permits, and the opening 29 or the openings 24 permit the support to be secured to any other surface for the reception of any cord wire or the like for any purpose.

In Figs. 4 to 6, in which like numbers indicate parts corresponding to those previously described, there is illustrated another embodiment of my invention, the cord support being indicated generally by the numeral 30. The support 30 comprises a central plane section or portion 31 and two arms 32. Each of the arms 32 includes an inner portion 33, an intermediate portion 34, and a return portion 35. The inner portions 33 diverge outwardly, the intermediate portions 34 extend outwardly from the inner portions 33 in a plane substantially parallel to the plane of the central portion 31, and the return portions 35 are directed toward the wall plate 11, preferably so that they diverge toward the wall plate 11, as is illustrated in Figs. 4 and 6.

The outer surface of the return portions 35 may be knurled or roughened, as indicated by the numeral 36, to facilitate the gripping of these portions when they are moved toward each other in order to eject the prongs 14 from the socket 12.

As illustrated in Fig. 4, the excess length of the electric cord 19 may be readily wound around the support 30 and is retained thereon by the return portions 35 of the arms 30. This and the other embodiments of my invention may, if desired, be provided with a second pair of openings 37 in the central plane portion 31, so that the support may be secured between the cap 15 and the wall plate 11 in either a vertical or horizontal position.

Illustrated in Figs. 7 and 8 is a cord support 39 including a central plane portion 40 and diverging arms 42. The central plane portion 40 is provided with a pair of openings 43 for the reception of the prongs 14. Each of the arms 42 is provided with an engaging member 44, which includes an outwardly extending portion 45 and a return portion 46, the latter terminating adjacent the surface of its associated arm 42. The engaging members 44 in this embodiment of the invention are formed by cutting them from the arms 42. These engaging members 44 are for the same purpose and perform the same function as the engaging members 26 previously described.

In all of the embodiments of my invention the outer extremities of the diverging arms may be readily moved toward each other by the application of slight manual pressure. As illustrated in Fig. 9, such movement of the diverging arms bends or curves the central plane portion connecting them so that it is concave outwardly. Such deformation of the central plane portion of the support forces the cap 15 away from the wall plate 11, freeing the prongs 14 from the socket 12. The facility with which the central plane portion of the support is thus deformed may be enhanced by forming the central plane portion so that it is of lesser thickness at its middle than at its extremities.

While I have illustrated and described forms of my invention, each having a pair of diverging arms, the cord support may be formed with only one such arm and its connected or associated parts, and such a support finds utility particularly when it is secured in a vertical position between the cap and the wall plate on a vertical wall, in which position the excess length of an electric cord of an appliance, such as an iron or razor, may be readily looped thereon.

It will be apparent that all of the forms of my invention hereinbefore illustrated and described serve to support adjacent the wall plate and socket the excess length of an electric cord connecting the socket to any appliance. Likewise, all such forms of my invention permit of the ready removal of the cap from the socket by the deformation of the central portion of the support as a result of the longitudinal pressure of the support. Furthermore, all such forms of the invention permit an individual to grasp the extremities of the support and thus remove the cap from the socket without touching the socket or the electric cord.

While I have described the support of my invention as used in connection with an electric cord for an electric appliance, this was only for the purpose of illustrating its advantages by describing an example of its use. It has utility applied to any surface for supporting cord wire or any flexible member employed for a variety of purposes such as cord for curtains, Venetian blinds, shades, and awnings both indoors and outdoors.

While those embodiments of my invention hereinbefore illustrated and described are fully capable of performing the objects and accomplishing the advantages primarily stated, various modifications may be made in such forms which will also embody my invention. The invention is to be understood, therefore, as not restricted to the specific embodiments illustrated and described but as including all variations thereof coming within the scope of the claims which follow.

I claim as my invention:

1. In a support for an electric cord having a cap for releasable connection to a socket, the combination of: a plane section adapted for reception between the cap and socket while the cap and socket are electrically connected; arms extending outwardly from said plane section; and auxiliary arms projecting from said plane section and in the plane of said plane section and behind said arms, said arms and said auxiliary arms being so spatially related as to retain coils of the electric cord therebetween during connection of the cap to and its disconnection from the socket, said plane section being formed of a dielectric material sufficiently resilient as to loosen the cap from the socket by its deformation responsive to manual force urging said arms together.

2. In a support for an electric cord having a cap for releasable connection to a socket, the combination of: a plane section adapted for reception between the cap and socket while the cap and socket are electrically connected; arms extending outwardly from said plane section; auxiliary arms projecting from said plane section and in the plane of said plane section and behind said arms, said arms and said auxiliary arms being so spatially related as to retain coils of the electric cord therebetween during connection of the cap to and its disconnection from the socket, said plane section being formed of a dielectric material sufficiently resilient as to loosen the cap from the socket by its deformation responsive to manual force urging said arms together; and an engaging member carried by one of said arms and extending adjacent thereto at such a distance therefrom as to engage frictionally a portion of the electric cord passing between said engaging member and said associated arm.

FRANK E. BROWN.

REFERENCES CITED

The following references are of record in the file of this patent:

UNITED STATES PATENTS

| Number | Name | Date |
| --- | --- | --- |
| 1,531,604 | Gaynor | Mar. 31, 1925 |
| 1,618,723 | Pearson | Feb. 22, 1927 |
| 1,696,495 | Malling | Dec. 25, 1928 |
| 2,051,425 | Schlums | Aug. 18, 1936 |
| 2,167,541 | Young | July 25, 1939 |
| 2,231,001 | Engstrom | Feb. 11, 1941 |